Figure 3:
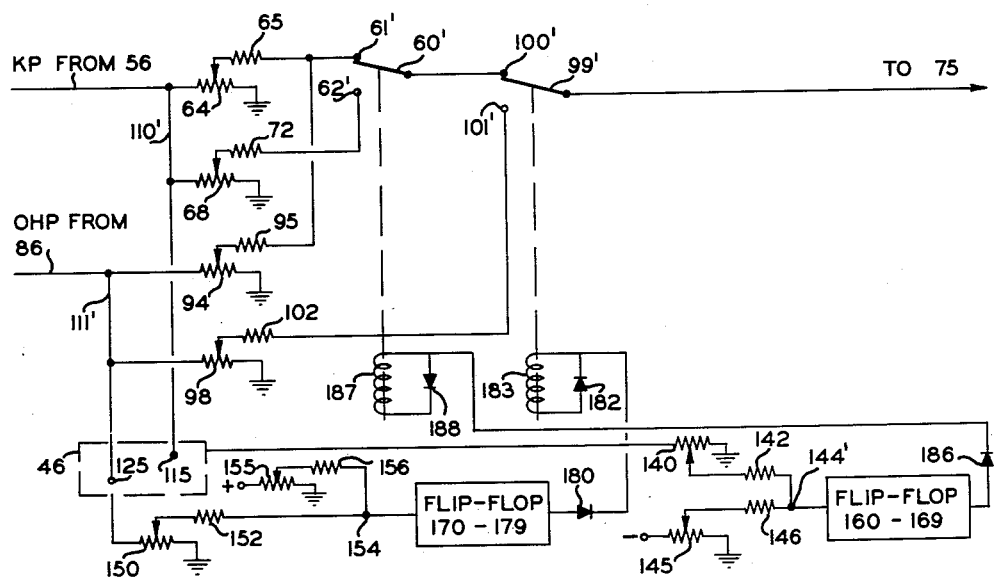

Jan. 23, 1962 L. W. MORGAN 3,018,230
FRACTIONATOR CONTROL SYSTEM
Filed July 13, 1959 2 Sheets-Sheet 1

INVENTORS
L. R. FREEMAN
L. W. MORGAN
BY
Hudson & Young
ATTORNEYS

United States Patent Office 3,018,230
Patented Jan. 23, 1962

3,018,230
FRACTIONATOR CONTROL SYSTEM
Lyman W. Morgan, Golden, Colo., and Lawrence R. Freeman, Bartlesville, Okla., assignors to Phillips Petroleum Company, a corporation of Delaware
Filed July 13, 1959, Ser. No. 826,638
12 Claims. (Cl. 202—40)

This invention relates to improved systems for automatically controlling a fractionator. Specifically, it relates to improvements in those systems wherein control is normally derived from a differential measurement of conditions either across the column or across the column products. Even more specifically, this invention relates to an improvement whereby the differential control normally controls the system until a column upset occurs which drives one or the other of the control measurements outside of a predetermined range, whereupon such measurement is selected by decision making means to take over and restore the system to normal operating condition.

In the prior art it is known to control fractionators by taking differential measurements across the fractionator and controlling therefrom. Such a system is shown in U.S. Patent 2,764,536 to J. W. Hutchins dated September 25, 1956. In such control systems the control signal is employed to manipulate a selected process variable such as heat, reflux, or the like.

The instant invention is an improvement on such control systems in that it provides decision making means for permitting such differential control only while the individual measurements remain within predetermined ranges. Whenever one or the other of such measurements moves outside of its range or limits due to a column upset, there are means provided to permit that measurement which is outside its range or limits to assume command of the control system. If, however, both of such measurements should move outside of their range, further means are provided to decide which of said measurements shall assume command. Control according to the chosen individual measurement (rather than the differential measurement) continues until normal operation is restored.

Another improvement embodied in our invention permits control by the relative importance of changes in the individual measurements. Thus, if it is necessary that one measurement should change ten times as much as the other in order to bring about an equal adjustment of the controlled variable (e.g. heat) means are provided to permit such relative weighting, to achieve preferential but non-exclusive control.

In the preferred embodiment, an electrical decision making circuit is provided that has switching means responsive to signals that are generated when a measurement indicates an upset condition to exist in a fractionator. Whenever such condition produces a measurement that exceeds its range, it causes a switching action which permits it to assume command. Part of the decision making circuit provides means responsive to one such measurement which blocks relay or switching means actuation whenever both of such measurements are outside of their range. The latter feature is to permit control responsive to one predominant measurement when both such measurements exceed their preselected range or limits. Also, multiplying means are provided for weighting the individual measurements, thus to permit preferential but non-exclusive control from one such measurement even when normal conditions prevail.

Accordingly, it is an object of this invention to provide an improved differential measurement control system for fractionators. It is a further object of this invention to provide such an improved system wherein one of such measurements assumes command of the control system upon such measurement exceeding its predetermined limits. Another object is to provide a system that exercises preferential but non-exclusive control even during normal conditions. A further object permits one such measurement to assume command in preference to the other such measurement when both of them exceed their preselected limits. Other objects and advantages will become apparent from the following disclosure.

Figure 1:
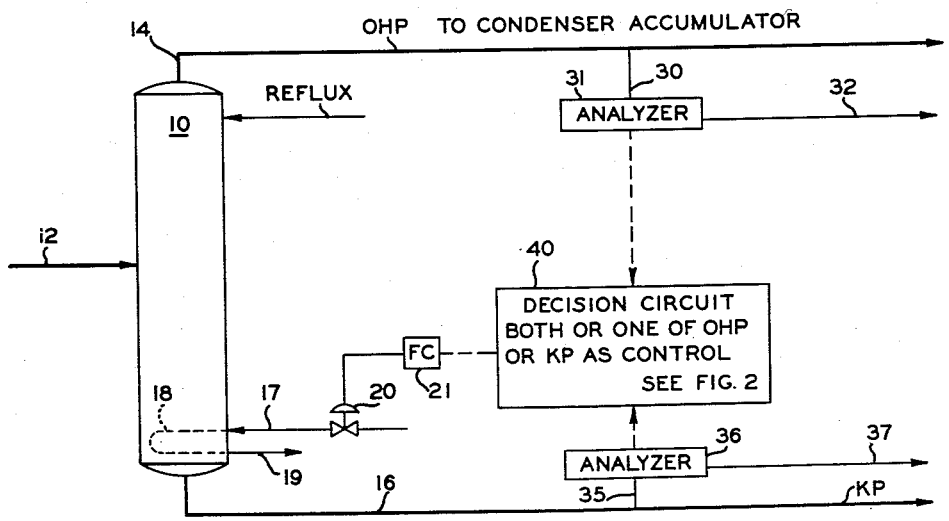
Figure 2:
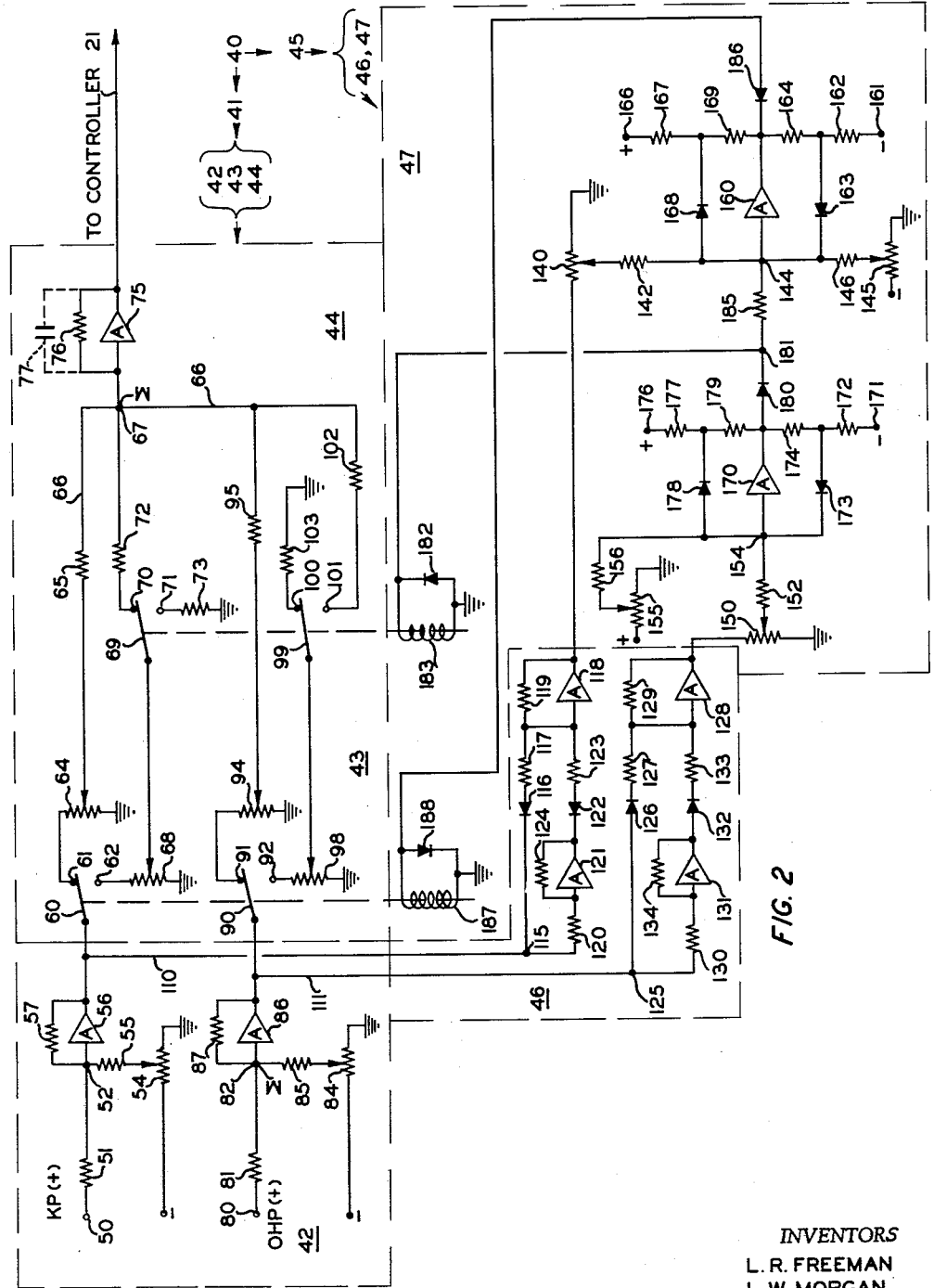

In the drawings: FIGURE 1 shows schematically a fractionator system employing the decision circuits of the instant invention; FIGURE 2 shows schematically a preferred embodiment of the decision circuit to be employed in FIGURE 1; FIGURE 3 is a modification of FIGURE 2. Throughout the drawings the same reference numerals refer to the same elements and primed reference numerals refer to modifications thereof.

In FIGURE 1 is shown a fractionating column 10 having a feed conduit 12 connected thereto. Overhead products are removed through conduit 14 and conduit 16 connects to the bottom of the column for removing kettle products therefrom. Heat is supplied to the kettle by flowing steam through conduits 17, heating coils 18, and removing the condensate through line 19. A control valve 20 controls the flow through the heating means responsive to signals transmitted to the valve from flow controller 21. Controller 21 might also include a transducer for changing signals from electrical to pneumatic or the like.

Other controls such as kettle liquid level controls, reflux and accumulator controls, and the like may be as shown in the aforesaid Patent 2,764,536.

The measuring and control system includes a sample conduit 30 which feeds a sample of overhead product continuously to the analyzer 3. The sample is vented from the latter through a vent line 32. A similar sample conduit 35, analyzer 36 and vent conduit 37 are shown with respect to the kettle product. The analyzers may be infrared analyzers as illustrated and explained in the aforesaid patent to Hutchins. The output signal from the analyzers 31 and 36, respectively, are transmitted through appropriate means to decision circuit 40, the details of which are shown in FIGURE 2. It is preferred that these signals be transmitted in electrical form.

FIGURE 2 shows the decision circuit 40 to have a control signal generator 41 comprising an error signal generator 42, a weighting circuit 43 (for preferential but non-exclusive control), and comparing circuit 44. In addition, the circuit 40 includes a switch actuating circuit 45 which further includes a polarity circuit 46 and a decision making circuit 47. The polarity circuit 46 is also known in the art as an "absolute value circuit." The construction and operation of the circuits of 40 will now be described.

The error signal generator 42 comprises a first input terminal 50 for receiving a positive polarity kettle product analysis (KP) signal from analyzer 36. This is applied across resistor 51 to junction 52. A negative comparison signal, e.g. a signal representative of a preselected limit or set point of KP is provided through the potentiometer 54 and the resistor 55 to the junction 52. Resistors 51 and 55 are of equal resistance so that a summing circuit, in effect, is formed by their junction at 52. An amplifier 56 has its input connected to junction 52. A resistor 57 in the feed-back circuit around 56 also connects to the junction 52.

The output of the amplifier is applied to the weighting circuit 43 at a switch 60 operating between normally closed contact 61 and normally open contact 62. Contact 61 is connected to a multiplying means comprising a potentiometer 64, the contactor of which is connected to a lead 66 across resistor 65. Lead 66 connects to junction 67. An alternative path to junction 67 is provided from contact 62 through potentiometer or voltage divider 68, switch 69, normally closed contact 70 and resistor 72. The switch 69 operates between contacts 70 and 71, the latter being normally open and connected to ground through a resistor 73.

The junction 67 is connected to the input of an amplifier 75 which has a feed-back circuit comprising resistor 76 and capacitor 77 connected in parallel. Capacitor 77 is an optional feature and may be omitted. Its purpose is to smooth out the effects of operating switches 60, 69, 90 and 99.

The remainder of generator 41 is generally similar to that just described except that it is designed for receiving and performing the same operations on the overhead products (OHP) stream. The terminal 80 receives the positive polarity OHP analysis signal and applies it across resistor 81 to terminal 82 which receives a negative signal from potentiometer 84 applied across resistor 85. Resistors 81 and 85 are of equal magnitude to form a summing circuit at junction 82. The signal appearing at 82 is applied to the amplifier 86 which has a feed-back circuit containing resistor 87 that connects to junction 82. The output from the amplifier is applied to a switch 90 operating between contacts 91 and 92, the former being normally closed. Contact 91 connects to weighting circuit, i.e. voltage divider 94, and is applied across resistor 95 to the lead 66, thence to junction 67. An alternate route from switch 90 to junction 67 is provided from normally open contact 92 across voltage divider 98 and switch 99, the latter operating between terminals 100 and 101. Terminal 101 connects across resistor 102 to lead 66. Terminal 100 is connected to ground through resistor 103.

The comparing circuit 44 includes switches 69 and 99; resistors 65, 72, 95, 102; common lead 66; and amplifier 75. The resistors are of equal value to form a summing circuit.

Leads 110 and 111 connect the outputs of their respective amplifiers to the polarity circuit 46. The purpose of the polarity circuit 46 is to produce a signal having a predetermined polarity from signals of either polarity appearing in the leads 110 and 111.

Circuit 46 has two main channels (one each for the error signals from KP and OHP), each of which channels has two sub-channels (a first for one polarity of input and a second for the opposite polarity).

The lead 110 connects to a junction 115 which is the input terminal of one main channel, and is in turn connected to the second sub-channel comprising series circuit comprising rectifier 116, resistor 117 and the input of amplifier 118. The amplifier has a feed-back circuit that includes resistor 119 connected therearound. The junction 115 also provides another route to the input of amplifier 118 through the first subchannel that includes the series circuit comprising resistor 120, amplifier 121, rectifier 122, and resistor 123. A feed-back circuit around amplifier 121 includes resistor 124. The output from amplifier 118 is preferably a positive polarity signal that is applied to the decision circuit 47.

The signal appearing in lead 111 is applied to a circuit of construction similar to that just described for the connection to lead 110. This circuit comprises a junction 125 having a first sub-channel through rectifier 126, resistor 127 and the input of amplifier 128. The amplifier includes a feed-back circuit there around having resistor 129 therein. A second subchannel from the junction 125 is comprised of the series connected resistor 130, amplifier 131, rectifier 132 and resistor 133. The latter sub-channel as shown connects into amplifier 128. A feed-back circuit around amplifier 131 includes resistor 134 therein. The output from the amplifier 128 is preferably a negative signal. The signal appearing at the output of 128 is fed into the decision circuit 47.

The purpose of the decision circuit 47 is to decide if the output signals from respective amplifiers 118 and 128 indicate an upset condition, and if so to manipulate certain of the switches in the control signal generator 41. Circuit 47 also selects one of these signals to manipulate the switches if both such signals indicate an upset. The output from 118 is fed into the decision circuit 47. In the latter it is fed to a multiplying means such as voltage divider 140 and applied across resistor 142 to the junction 144. A negative polarity signal for comparison is supplied from potentiometer 145 across resistor 146 to the junction 144 where it may be compared with the signal from 142. It should be noted that resistors 142 and 146 are matched to form a summing circuit for the purposes of this comparison.

A second channel within the decision circuit 47 and having a configuration similar to that just described applies the output of amplifier 128 to a multiplying means such as voltage divider 150, thence across a resistor 152 to a junction 154. A positive polarity comparison signal is provided from potentiometer 155 across resistor 156 to the junction 154. The resistors 152 and 156 are or equal magnitude so that a summing or comparison circuit is formed by their junction at 154.

The junctions 144 and 154 are each connected to what is commonly called a bistable multivibrator or a flip-flop circuit. In the instant case, this flip-flop circuit is of such nature that it responds to signals of a certain polarity and greater than a certain magnitude by driving hard against either the upper or lower limit of the flip-flop. This means that if the signal appearing at the respective terminals 144 and 154 is not of great enough magnitude, nor of proper polarity, it will not change the condition of the multivibrator. On the other hand, if this signal is of a certain polarity and amplitude, it will change the condition of the multivibrator. Similarly, once the particular multivibrator has been operated, it can be restored to its former condition only by another signal of different polarity and different magnitude. These circuits will now be described.

Junction 144 is connected to one input terminal of an amplifier 160. A negative polarity terminal 161 is connected to the amplifier output across series connected resistors 162 and 164. A rectifier 163 is connected at one end to 144 and at the other end between resistors 162 and 164. A similar configuration connects positive terminal 166 to the amplifier output across resistors 167 and 169 with rectifier 168 connected at one of its terminals between 167, 169 and to 144 at the other terminal. Rectifiers 163 and 168 oppose current flowing from terminals 161 and 166, respectively.

The flip-flop or multivibrator connected to junction 154 is similar to that just dscribed for elements 160—169 and includes an amplifier 170 having a negative terminal connected to its output across resistors 172 and 174 and a rectifier 173 connected between 172 and 154. A positive terminal 176 is connected to the output across resistors 177 and 179. Rectifier 178 opposes current flow from the positive terminal to the junction 154.

Although there is remaining circuitry to be described in detail at this point it would be well to point out, broadly, how the various circuits cooperate. The control signal generator 41 produces error signals in its subcircuit 41. When the fractionator is operating so that both product streams are within their respective ranges, these error signals are combined in the sub-circuits denoted as 43 and 44 and are used to control the system. When an upset occurs (i.e., when one, the other, or both product streams get out of their range), the switch actuating circuit 45 operates, changes the configuration of circuits 43 and 44, and puts the upset product stream in command of the control system by supplying only the error signal thereof to controller 21.

Circuit 45 decides which of the switches are operated as follows: When the KP is detected to be out of range, the error signal flows through lead 110, polarity circuit 46, and is ultimately applied to junction 144; this operates the flip-flop 160—169 to pass a signal to relay coil 187

(hereinafter described). This action operates switches 69 and 90 to prevent the OHP signal from being applied to the controller. The operation is similar when the OHP gets out of range, except the error signal flows along lead 111, operates flip-flop 170—179, and arrives at junctions 181 and 144. The signal at 181 operates the relay coil 183 to move switches 69 and 99, while the signal at 144 operates the coil 187 and blocks any signals from the KP channel. This blocking feature enables the circuit to place the OHP in command whenever both streams are out of range. In the manner described, each channel (KP or OHP) of the circuit responds to an upset by switching the other one out and applying only error signals of the upset stream to operate the controller, and one channel does this when both process streams are upset.

The output from 170 is applied across a rectifier 180, thence to the junction 181. From the junction 181 the output goes through a first channel comprising a parallel circuit of rectifier 182 and coil 183 connected between the junction and ground. The coil 183 is a solenoid coil in a relay that operates the switches 99 and 69. Another channel from junction 181 applies a signal thereat across resistor 185 to the junction 144.

The signal from 144 is applied to the amplifier 160, thence to rectifier 186 and if it passes 186, to the circuit comprising coil 187 and rectifier 188 connected in parallel between 186 and ground. The coil 187 is the solenoid coil and a relay for operating switches 60 and 90 respectively.

FIGURE 3 is a modification of the apparatus shown in FIGURE 1. Generally, the circuit elements perform the same function but the switching arrangement has been simplified. In FIGURE 3, the switch 60' connects the summing circuit 65 and 95 to the amplifier 75. The second contact 62' of the switch connects the KP signal to the amplifier 75 when the switch 60' is moved. Similarly, the switch 99' is arranged to connect switch 60' to amplifier 75 through contacting terminal 100'. When the switch 99' is moved against its contact 101', it removes the switch 60' from any control purpose and puts the signal appearing from resistor 102 into command of the system. The signal from 102 is, of course, the OHP signal from the amplifier 86.

In general the switch actuating circuit 45 is substantially the same as above, the principal difference being that the junction 144' only has two summing resistors thereat instead of three as shown in FIGURE 2.

It is preferred to use phase inverting amplifiers for the circuit of FIGURE 2. Such amplifiers are described in "Applications Manual for Philbrick Octal Plug-in Computing Amplifiers" copyright 1956 by George A. Philbrick Researches, Inc. As explained in said manual with respect to adding and subtracting circuits, wherever, a summing or comparison circuit is referred to above, the resistors connecting thereinto are all of equal value unless otherwise stated. The amplifiers in the multivibrator circuits have gains on the order of $1 \times 10^8$.

The circuit connected to the input of amplifier 75 has been described as a summing circuit whereas the description at the beginning of this has reference to differential control. This is because a summed signal may be used for control purposes where it is feasible or desirable to sacrifice some sensitivity. However, if desired, the circuit can be modified as shown in said manual on page 16 to provide a more sensitive subtracting circuit. Similarly, the addition circuit itself can be modified in various ways, some of which are shown in said manual. The various multiplying or weighting means described, i.e. 64, 68, 94, 98, 150 and 140, are all provided in order that the signals applied thereto can be given their respective weight for purposes of comparison.

In describing the operation of the instant invention, it will be assumed that it is desired to separate butadiene from a feed stream of itself, butene-2's, acetylenes, and other related hydrocarbons. Such a fractionation process is shown, for example, in United States Patents 2,415,006 and 2,750,435. In such a separation it will further be assumed that it is desired to produce an overhead stream having a butadiene content in the range 98.0 to 98.2 percent, with a set point of 98.1 percent butadiene therein. Similarly, the butadiene content of the kettle product stream should be maintained in the range of 4.8 to a maximum of 5.0 percent with a set point of 4.9. In this separation, experience has shown that it is difficult to separate butadiene from the butene-2's and that one of the big factors in uneconomic operation is the loss of butadienes through the kettle product stream. However, experience has also shown that for economical operation it is best to tolerate some losses in the kettle product stream in order to best achieve the desired purity in the overhead stream. Hereinafter, for purposes of this example, when we refer to normal conditions we refer to those conditions where both the overhead and kettle streams are within their respective limits. Upset is when one or both is/are outside of the limit(s).

Accordingly, the potentiometer 54 is adjusted so that a signal appearing on the contactor thereof represents the set point of 4.9 percent butadiene in the kettle product stream. This is equivalent to setting the set point on a controller. In similar fashion, potentiometer 84 is adjusted to provide a signal on its contactor equivalent to a set point of 98.1 percent butadiene in the overhead stream. Potentiometers 145 and 155 are adjusted so that the polarities of the signals appearing at the respective junctions 144 and 154 are negative and positive, respectively, when normal conditions prevail. These polarities change during upset. Potentiometers 145 and 155 are adjusted so that the polarities are as stated for normal operation. This setting determines (together with the gains in the absolute value circuits) the range over which the variable OHP or KP may vary without operating the decision circuit.

The circuit of FIGURE 2 should now be in the position shown in the drawing. This is in the position in which the various elements, especially the various switches, are when the normal conditions prevail. In other words, this is the normal operating condition of the plant and as long as the respective product streams maintain their butadiene content between 98.0 and 98.2 percent and between 4.8 and 5 percent, the control circuit will remain in the position shown and the control signals applied to the valve 20 will reflect the instantaneous operating conditions. This function is carried out by the circuit denoted as 41, wherein an error signal is produced in circuit 42, a weight (e.g. a ratio of multipliers in 64 and 94 of ¼ based on ideal operating conditions) is attributed to the particular error, according to which product stream is being considered and according to the weight desired to be given this product stream error, and the computation of a control signal is carried out in the comparing circuits 44.

This is accomplished by measuring the butadiene content of the product streams with the analyzers 31 and 36, applying the signals thus obtained to the respective terminals 80 and 50 of FIGURE 2, then comparing them with the set point signals from 84 and 54. The resulting signals are termed error signals. The error signals are then amplified, multiplied (circuit 43) and compared by summing in circuit 44. The resulting signal appears on lead 66, is then amplified and transmitted to controller 21 whereupon valve 20 can be appropriately positioned.

As long as the system is operating under the above-described normal conditions, the output of the amplifiers 56 and 86 are always within their respective ranges of ±0.1 percent. This is because the set points of 54 and 84 are of such magnitude as to always produce this effect across the phase inverting amplifiers when summed with their respective signals, the latter appearing at terminals 50 and 80. While such normal conditions exist, two of the four sub-channels in the polarity circuit 46 are rendered operative, but the flip-flops in the decision circuit 47 to which signals from the polarity circuits are fed do not change state because the magnitude of the signals from potentiometers 145 and 155 is sufficient to prevent any change in polarity at the junctions 144 and 154. A change in polarity operates the flip-flops, and such a change occurs only when the polarity circuit output signal changes in magnitude responsive to an upset signal.

Measurements and adjustments in the foregoing manner are continued until such time as the column suffers an upset and causes one of the product streams to go outside of the range or limit set therefor on the set point means 54 and 84. Assume the amount of butadiene in the kettle product stream is detected to exceed 5.0 percent.

Thereupon, the magnitude of the error signal applied to junction 115 increases beyond 0.1. The magnitude of the signal appearing at the output of the polarity circuit 46 (i.e., output from amplifier 118) is increased. Upon this event occurring, a larger signal is multiplied at 140, compared at 144, and then is applied to the flip-flop 160—169. It is this larger signal that changes the state of the flip-flop and causes switching to place KP in control of the system until the column operation is restored. Operations in the opposite direction take place upon restoring.

The increase in magnitude causes the polarity at junction 144 to change from the normal negative to positive. Multivibrator 160—169 responds to this change by driving hard against its negative limit, thus generating a signal that will pass rectifier 186 and operate coil 187, hence to move switches 60 and 90 against their normally closed contacts. The switching action passes the OHP signal to ground through resistor 103 and increases the weight attributed to the KP signal by sending it through the multiplier 68. The control signal then opens the valve 20 to increase steam flow.

On the other hand, if the overhead product stream exceeds its limit of 98 percent butadiene, e.g. drops below its limit of 98 percent butadiene, a similar reaction occurs in the circuit to which lead 111 is connected. In this instance, the output signal from amplifier 128 is always negative and the change in magnitude of such signal is sufficient to provide a signal at junction 154 (after multiplication at 150) which is big enough to overcome the comparison signal from potentiometer 155, thereby to change the polarity of the input signal to the multivibrator 170—179. This phenomenon then drives the multivibrator against its negative limit and thus provides a signal from the output of 170 across rectifier 180 to the junction 181, thence through two channels first 185, 144 (polarity change), 160, 186 (conductive with polarity change at 144) to 188 and second to the coil 183. This moves switches 60, 69, 90 and 99 against their respective contacts 62, 71, 92 and 101. The result is to take the kettle product stream analysis out of the control system and to provide a control signal that includes only the overhead product stream signal which appears at terminal 80 and is transmitted from there through switch 90 and terminal 92 and switch 99 and terminal 101 to the junction 67. The steam valve, accordingly, is moved closed to reduce steam flow.

The above events take place regardless of the direction in which the error occurs, since any condition outside of the respective ranges of 4.8–5.0 and 98.0–98.2 will produce a signal large enough to cause these events. The set points do not have to be in the middle of the ranges, as explained above. When not in the middle, the gains through respective subchannels in the polarity circuit 46 must be adjusted, preferably by proportioning the ratio of resistance 117 to 123, or of 127 to 133. When in the middle, the overall gain through each subchannel can be unity.

There is another event which the circuit of FIGURE 2 is designed to accommodate. This is the event when both kettle and overhead product streams exceed their preselected ranges. The circuit of FIGURE 2 is designed to select the overhead product stream as the control signal when this event occurs.

When both such product streams exceed their limits, the error circuit 42 and the polarity circuit 46 react as above described. The result is that two polarity-corrected error signals at junction 144, the KP signal appearing across resistor 142 and the OHP signal being applied thereto across resistor 185. Upon this event occurring the magnitude of the OHP signal across 185 is such that it completely overcomes the signal appearing across resistor 142, thus to drive and hold the multivibrator 160—169 at its negative output limit regardless of what the KP signal is. In short, multivibrator 160—169 is rendered completely responsive to the OHP signal. Of course, the signal at junction 144 will remain at positive polarity until the OHP restores, or gets back within its limits of 98.0–98.2.

Upon such event, all switches 60—99 are moved to the positions described for an OHP upset alone.

The system of FIGURE 3 operates in much the same manner as that in FIGURE 2. When error is detected in the KP signal, the switch 60' is caused to move against contact 62'. This, as explained above, is sufficient to switch the system from the control of both KP plus OHP to control from KP alone. However, the system is designed (as is that of FGURE 2) so that the OHP will be switched into command of the control system at any time that OHP exceeds its limits, even when it does so at the same time KP exceeds its limits. This is accomplished by switching 99' against contact 101'. The latter action differs from that of FIGURE 2 in that the instant system only operates one switch, 99' rather than four switches as in FIGURE 2 in order to effect control from the OHP. Also, in order to effect control from the KP signal, only one switch, 60', need be moved as compared with two switches in the configuration of FIGURE 3.

It should be evident that we have provided improved circuits for differential control. When we use the term "differential," we refer to control from the algebraic sum of two measurements made on process streams or conditions around a fractionator. The term therefore refers to a combined signal and includes addition as well as subtraction. The system is capable of use in conjunction with other control systems which are presently known to the art and can supplement their operation. One of the advantages of employing our invention is that it reduces bottom losses of butadiene in the example given. Further, the weighting circuit 43 permits control from two different measurements in accordance with their relative importance in the process. In addition, it improves the quality of the product obtained. Moreover, it is economic of heat and thus decreases the cost of the process from this standpoint. Generally it may be said that a more rapid return to normal is enabled by our invention. Further, it should be evident that if desired to control from other types of differential measurement, it would be possible to use temperature, pressure, or flow measuring devices, and other types of analyzers, e.g. ultraviolet analyzers, differential refractometers, and chromatographic analyzers. Moreover, the instant invention can be applied to systems other than butadiene fractionation. It is not necessary that both analyzers be sensitized to read the same composition because it may be desired to sensitize the instruments to different compositions which occur at various points in the process, e.g. one analyzer could be sensitized for butadiene and the other could be sensitized for acetylene.

While we have shown our invention with respect to specific embodiment and application, it is not our intention to limit ourselves to such specific application or embodiment but to include thereto all the applications and modifications thereof which would be of use to one skilled in the art.

We claim:

1. In a fractionating system including first and second means for measuring operating variables of the system and for producing, respectively, first and second signals representative of the respective variables measured, means for combining said first and second signals to produce a control signal, and means responsive to said control signal for regulating the operation of the system; improved control apparatus for limiting the range of each of said first and second signals over which said means for controlling is responsive comprising means for sensing deviation of each of said first and second signals outside respective preselected ranges, and means responsive to said means for sensing to apply a third signal to said means for regulating in place of said control signal, said third signal being representative of such first and second signal that exceeds its preselected range.

2. The apparatus of claim 1 wherein said apparatus for limiting comprises a control signal generator including said first and second means, a plurality of channels through said means for combining, and means for switching to connect said first and second means to selected ones of said channels; and a switch actuating circuit to operate said means for switching to either of said first or second signals exceeding its respective range.

3. The apparatus of claim 2 wherein said switch actuating circuit comprises a polarity circuit having first and second channels therein connected to said first and second means, respectively; and a decision making circuit connected in series with said polarity circuit; said decision making circuit actuating said means for switching in response to either of said first and second signals exceeding its respective range and applying a signal through one channel of said polarity circuit to said decision making circuit.

4. The apparatus of claim 2 wherein said first and second means, as disposed within said control signal generator, each comprises a channel in an error signal generator; and said channels, within said means for combining, each comprises a means for weighting and a means for combining.

5. The apparatus of claim 2 wherein said switch actuating circuit includes a polarity circuit having first and second channels therein, each channel having means for receiving one of said first and second signals, respectively; a decision making circuit comprising one channel having a first summing junction therein, a first means for multiplying connected between said first junction and said first channel, means for feeding a first comparison signal to said first summing junction, another channel having a second summing junction, a second means for multiplying connected between said second junction and said second channel, means for feeding a second comparison signal to said second summing junction, first and second multivibrators connected to said first and second summing junctions, respectively, first and second rectifiers connected to the respective outputs of said first and second multivibrators, and means for feeding signals from said second multivibrator output through said second rectifier to said first summing junction.

6. The apparatus of claim 2 wherein said first and second means, as disposed within said control signal generator, each comprises a channel in an error signal generator; and said channels, within said means for combining, each comprises a means for weighting and a means for combining; said switch actuating circuit comprises a polarity circuit having first and second channels therein connected to said first and second means, respectively; and a decision making circuit connected in series with said polarity circuit; said polarity circuit actuating said means for switching in response to either of said first and second signals exceeding its respective range and applying a signal through one channel of said polarity circuit to said decision making circuit.

7. The apparatus of claim 2 wherein said switch actuating circuit includes a polarity circuit having first and second channels therein, each channel having means for receiving said first or second signals, respectively; a decision making circuit comprising one channel having a first summing junction therein, a first means for multiplying connected between said first junction and said first channel and means for feeding a first comparison signal to said first summing junction, and another channel having a second summing junction, a second means for multiplying connected between said second junction and said second channel, means for feeding a second comparison signal to said second summing junction, first and second multivibrators connected to said first and second summing junctions, respectively, and first and second rectifiers connected to the respective outputs of said first and second multivibrators.

8. In a fractionating system including first and second means for measuring operating variables of the system and for producing, respectively, first and second signals representative of the respective variables measured, means for combining said first and second signals to produce a control signal, and means responsive to said control signal for regulating the operation of the system; improved control apparatus for limiting the range of each of said first and second signals over which said means for controlling is responsive comprising an error signal generator including first and second means for summing set point signals with said first and second signals, respectively; first and second double throw switches; first, second, third and fourth potentiometers, each having one terminal thereof connected to a contact of one of said switches; first, second, third, and fourth resistors connected at one respective terminal thereof to a summing junction; the other terminals of said first and third resistors being connected, respectively, to the contactors of said first and third potentiometers; a third switch disposed between said second resistor and the contactor of said second potentiometer; a fourth switch disposed between said fourth resistor and the contactor of said fourth potentiometer; means for moving said first and second switches to connect in series said first means for summing and said second potentiometer only in response to said first signal exceeding its respective range; and means for moving said second and fourth switches to thereby connect in series said second means for summing, said fourth potentiometer, and said fourth resistor in response to said second signal exceeding its respective range.

9. In a fractionating system including first and second means for measuring operating variables of the system and for producing, respectively, first and second signals representative of the respective variables measured, means for combining said first and second signals to produce a control signal, and means responsive to said control signal for regulating the operation of the system; improved control apparatus for limiting the range of each of said first and second signals over which said means for controlling is responsive comprising means for sensing deviation of each of said first and second signals outside preselected ranges, and means responsive to said means for sensing to apply a third signal to said means for regulating in place of said control signal, said third signal being representative of such first and second signal that exceeds its preselected range; means for selecting one of said first and second signals when both exceed their respective ranges and for providing said third signal to said means for regulating in response to the signal so selected, said third control signal then being representative of the signal so selected; and means for exercising preferential but nonexclusive control, while said first and second signals are within their respective ranges, by multiplying at least one of such signals by a predetermined factor prior to transmitting said one signal to said means for combining.

10. In a fractionating system including first and second means for measuring operating variables of the system and for producing, respectively, first and second signals representative of the respective variables measured, means for combining said first and second signals to produce a control signal, and means responsive to said control signal for regulating the operation of the system; improved control apparatus comprising means for sensing deviation of each of said first and second signals outside respective preselected ranges, means responsive to said means for sensing for applying a third signal to said means for regulating in place of said control signal, said third signal being representative of such first and second signal that exceeds its preselected range, and means responsive to said means for sensing for applying a fourth signal to said means for regulating in place of said control signal and said third signal when both of said first and second signals exceed their preselected ranges, said fourth signal being representative of one of said first and second signals.

11. In a fractonating system including first and second means for measuring operating variables of the system and for producing, respectively, first and second signals representative of the respective variables measured, means for combining said first and second signals to produce a control signal, and means responsive to said control signal for regulating the operation of the system; improved control apparatus for limiting the range of each of said first and second signals over which said means for controlling is responsive comprising means for sensing deviation of each of said first and second signals outside respective preselected ranges, means responsive to said means for sensing to apply a third signal to said means for regulating in place of said control signal, said third signal being representative of such first and second signal that exceeds its preselected range, and means for exercising preferential but non-exclusive control of said means for regulating while said first and second signals are within their respective ranges by multiplying at least one of said first and second signals by a preselected factor prior to transmitting said one signal to said means for regulating.

12. In a process for controlling a fractionation process wherein a differential measurement is made of an operating variable at two regions of the process and the process is regulated in response to the measurement; the improvement comprising regulating the process in response to the differential measurement as long as the variable at each of said regions remains within respective preselected ranges, discontinuing the step of regulating in response to the differential measurement when the variable at one of said regions exceeds its range, and thereafter regulating the process in response to the variable which has exceeded its range.

References Cited in the file of this patent

UNITED STATES PATENTS

| | | |
|---|---|---|
| 2,476,280 | Bragg et al. | July 19, 1949 |
| 2,684,326 | Boyd | July 20, 1954 |
| 2,758,205 | Lubkin | Aug. 7, 1956 |
| 2,764,536 | Hutchins | Sept. 25, 1956 |
| 2,816,959 | Segerstrom et al. | Dec. 17, 1957 |
| 2,867,724 | Olson | Jan. 6, 1959 |